(12) United States Patent
Keicher et al.

(10) Patent No.: US 10,058,881 B1
(45) Date of Patent: Aug. 28, 2018

(54) APPARATUS FOR PNEUMATIC SHUTTERING OF AN AEROSOL PARTICLE STREAM

(71) Applicants: National Technology & Engineering Solutions of Sandia, LLC, Albuquerque, NM (US); Marcelino Essien, Cedar Crest, NM (US)

(72) Inventors: David M. Keicher, Albuquerque, NM (US); Adam Cook, Albuquerque, NM (US); Eloy Phillip Baldonado, Los Lunas, NM (US); Marcelino Essien, Cedar Crest, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 15/443,867

(22) Filed: Feb. 27, 2017

Related U.S. Application Data

(60) Provisional application No. 62/301,145, filed on Feb. 29, 2016.

(51) Int. Cl.
| | |
|---|---|
| *B05B 7/12* | (2006.01) |
| *B41J 2/02* | (2006.01) |
| *B05B 7/14* | (2006.01) |
| *B05B 12/18* | (2018.01) |
| *B41J 2/03* | (2006.01) |

(52) U.S. Cl.
CPC .......... *B05B 7/1263* (2013.01); *B05B 7/1481* (2013.01); *B05B 12/18* (2018.02); *B41J 2002/022* (2013.01); *B41J 2002/033* (2013.01); *B41J 2202/02* (2013.01)

(58) Field of Classification Search
CPC .............. B41J 2002/033; B41J 2202/02; B41J 2002/022; B05B 7/1481; B05B 7/1263; B05B 15/0431
See application file for complete search history.

(56) References Cited

U.S. PATENT DOCUMENTS

| | | |
|---|---|---|
| 4,019,188 A | 4/1977 | Hochberg et al. |
| 6,348,687 B1 | 2/2002 | Brockmann et al. |
| 6,924,004 B2 | 8/2005 | Rao et al. |
| 7,108,894 B2 | 9/2006 | Renn |
| 7,652,247 B2 | 1/2010 | Lee et al. |
| 8,119,977 B2 | 2/2012 | Lee et al. |
| 8,561,486 B2 | 10/2013 | Novosselov et al. |
| 8,714,716 B2 * | 5/2014 | Kwok ...................... B41J 2/045 347/54 |
| 2009/0115825 A1 * | 5/2009 | Peng .......................... B41J 2/04 347/92 |

* cited by examiner

*Primary Examiner* — Geoffrey Mruk
(74) *Attorney, Agent, or Firm* — Kevin W. Bieg

(57) ABSTRACT

The invention provides pneumatic shuttering of a focused or collimated aerosol particle stream. The aerosol stream can be collimated by an annular sheath of inert or non-inert gas. The apparatus propagates a sheathed aerosol stream through a series of aerodynamic lenses along the axis of a flow cell. The final lens is typically positioned above a substrate, so that direct material deposition is provided. A substantially perpendicularly-flowing gas external to the aerodynamic lens system is used to redirect the particle stream away from the flow axis and through an exhaust port, thereby shuttering the collimated aerosol stream. The pneumatic shutter enables printing of discreet structures, with on/off shuttering times of approximately 1 to 100 milliseconds.

4 Claims, 3 Drawing Sheets

APPARATUS FOR PNEUMATIC SHUTTERING OF AN AEROSOL PARTICLE STREAM

CROSS-REFERENCE TO RELATED APPLICATION

This application claims the benefit of U.S. Provisional Application No. 62/301,145, filed Feb. 29, 2016, which is incorporated herein by reference.

STATEMENT OF GOVERNMENT INTEREST

This invention was made with Government support under contract no. DE-AC04-94AL85000 awarded by the U. S. Department of Energy to Sandia Corporation. The Government has certain rights in the invention.

FIELD OF THE INVENTION

The present invention relates to direct printing and, in particular, to an apparatus for pneumatic shuttering of a stream of aerosol particles.

BACKGROUND OF THE INVENTION

An aerodynamic lens can be defined as a flow configuration in which a stream traveling through a cylindrical channel with diameter D is passed through an orifice with a smaller diameter d, undergoing one contraction upstream of the orifice and one subsequent and immediate expansion downstream of the orifice. A contraction of an aerosol stream is produced as the flow approaches and passes through the orifice. The gas then undergoes an expansion as the flow propagates downstream into a wider cross sectional area. Flow through the orifice forces particles towards the flow axis, so that the aerosol stream is narrowed and collimated. In the typical aerodynamic lens system, an aerosol stream is tightly confined around the axis of a flow cell by passing the particle distribution through a series of axisymmetric contractions and expansions. Each section of the lens system consisting of a flow channel and an orifice is defined as a stage. Aerosol streams collimated by an aerodynamic lens system have been designed for use in many fields, including pharmaceutical aerosol delivery and additive manufacturing.

Numerous studies have been performed to characterize the focusing effect created by propagating an aerosol stream through a single orifice consisting of a capillary tube, a converging nozzle, or a sheathed nozzle. See Cheng and Dahneke, *J. Aerosol Sci.* 10, 363 (1979); Dahneke, Nozzle-Inlet Design For Aerosol Beam Instruments, in J. J. Potter, *Rarefied Gas Dynamics, Vol. II* (pp. 1163-1172). New York: AIAA (1977); Dahneke, Aerosol Beams. In D. T. Shaw, *Recent Developments in Aerosol Science* (pp. 187-223). New York: John Wiley & Sons (1978); Dahneke, *J. Aerosol Sci.* 10, 257 (1979); Mallina, *J. Aerosol Sci.* 30, 719 (1999); and Mallina, *Aerosol Sci. Technol.* 33, 87 (2000). These theoretical and experimental studies conclude that single-orifice systems can only focus a narrow range of particle sizes to a sharp point. See R. Deng, *Aerosol Science and Technology* 42(11), 899 (2008). Specifically, single-orifice systems can focus a mono-dispersed aerosol distribution to a well-defined point, but poly-dispersed distributions will be focused at different positions along the flow axis, with the focal position and focused diameter dependent on the droplet size. A mathematical description of focusing of an aerosol stream passing through an orifice has been developed in terms of a critical Stokes number S*. See De la Mora, *J. Fluid Mech.* 195, 1 (1988). Particles with Stokes number above S*cross the flow axis at some finite distance from the lens, sub-critical particles do not cross the axis, and critical particles cross the axis at infinity.

In U.S. Pat. No. 4,019,188, Hochberg discloses an apparatus for producing a narrow, collimated stream of aerosol particles using a carrier gas jet and a surrounding sheath flow. The Hochberg apparatus uses a carrier gas velocity that forces particles to the center of the gas flow, surrounds the flow with a sheath gas, and directs the combined flow through a nozzle. A sheath flow upstream of an exit nozzle prevents impaction of particles onto the nozzle.

Many researchers have reported studies of aerodynamic focusing of aerosol streams using fixed multi-stage lens systems. Focusing of a stream of aerosol particles using a system of aerodynamic lenses was first reported by Lui in 1995. The system of Lui was used to narrow and collimate a beam of spherical particles with diameters of approximately 25 to 250 nanometers. Lui used a lens system having three to five stages, with emphasis placed on achieving a low pressure drop across each lens. Numerous experimental and theoretical studies have been performed subsequent to the work of Lui, considering the aerodynamic effects of single- and multi-orifice lens configurations.

In U.S. Pat. No. 6,348,687, Brockmann discloses an apparatus for generating a collimated aerosol beam of particles with diameters from 1 to 100 microns. Brockmann describes a multi-stage lens system that focuses large, solid particles. The aerodynamic lens system of Brockmann uses a series of fixed lens and an annular sheath gas surrounding a particle-laden carrier gas. The Brockmann apparatus also uses an annularly flowing sheath gas to prevent impaction of particles onto the orifice surfaces. The system of Brockmann was used to focus 15 micron aluminum particles to a diameter of 800 microns, and generally uses the same aerosol and sheath gas flow rates.

In U.S. Pat. No. 7,652,247, Lee discloses an aerodynamic lens system for focusing nanoparticles in air with diameters between 5 and 50 nanometers. In U.S. Pat. No. 8,119,977, Lee discloses a multi-stage, multi-orifice aerodynamic lens for focusing a range of particle diameters covering two orders of magnitude, from 30 to 3000 nanometers.

Aerodynamic focusing using a sheath gas is generally accomplished by propagating an annular sheath/aerosol flow through a continuously converging nozzle, using differing sheath and aerosol gas flow rates. The degree of focusing is proportional to the ratio of the gas flows. In U.S. Pat. No. 7,108,894, Renn discloses a method of aerodynamic focusing using a coaxial sheath gas flow that surrounds an aerosol-laden carrier gas. The combined flow is then propagated through a converging nozzle. Renn teaches that for the operational range of a flow system using a sheathed aerosol stream and a single converging nozzle, the diameter of the focused beam is a strong function of the ratio of the sheath to aerosol gas flow rates.

Various systems using aerosol-based or droplet-based deposition techniques have been reported as viable methods for direct printing or additive manufacturing. In U.S. Pat. No. 6,924,004, Rao discloses a method and apparatus for depositing films and coatings from a nanoparticle stream focused using an aerodynamic lens system. The apparatus of Rao uses high-speed impaction to deposit nanoparticles on a substrate. A method of separating particles from a gas flow using successive expansions and compressions of the flow created by an aerodynamic lens is discussed by Novosselov in U.S. Pat. No. 8,561,486.

In all cases, the material stream arriving at the substrate must be temporarily interrupted to allow for deposition of discreet structures. For systems wherein particles are produced and transported in a continuous mode, the stream can be interrupted using impact or non-impact methods. In on-demand systems, a single particle is produced by the application of a suitable force to a volume of fluid situated above an orifice. In some on-demand systems, it is preferable to provide a constant production of particles, while shuttering the resulting stream. The on-demand process can use impact or non-impact shuttering.

Impact shuttering schemes place a solid blade or spoon-like shutter in the aerosol stream, so that particles maintain the original flow direction but are collected on the shutter surface. Impact shutters typically use an electromechanical configuration wherein a voltage pulse is applied to a solenoid that rotates the shutter into the path of the aerosol stream. Impact-based shuttering can cause defocusing of the particle stream as the shutter passes through the aerosol stream. Impact shutters can also cause extraneous particle deposition as excess material accumulates on the shutter surface.

Aerosol shuttering can also use a pneumatic shutter to divert the aerosol stream from the original flow direction and into a collection chamber or to an exhaust port. Pneumatic shuttering is a non-impact process, so that no aerosol accumulation occurs above the substrate. Non-impact shuttering schemes can have shutter on/off times as small as 10 milliseconds.

External shuttering apparatuses use a shuttering mechanism that is external to the flow cell nozzle, and typically increase the working distance of the deposition head. An increased working distance can lead to deposition at a non-optimal nozzle to substrate distance. With internal shuttering, shuttering occurs in the interior of the flow cell, upstream of the final flow orifice. Internal shutters allow for the minimal nozzle to substrate distance, so that optimal focusing or collimation of the aerosol stream is provided.

SUMMARY OF THE INVENTION

The present invention is directed to pneumatic shuttering of an aerosol particle stream. Pneumatic shuttering is a pressure-driven process wherein gas flow is used to divert the flow of a focused or collimated aerosol stream propagating through a flow cell. The shuttering process enables direct deposition of discreet structures on various substrates. The aerosol stream can be a droplet stream, a solid particle stream, or a stream comprised of droplets and particles. As used hereinafter, the term particle will refer to both liquid droplets and solid particles. The invention can be used to shutter an aerosol stream formed from continuous or pulsed aerosolization sources, and can typically operate under constant pressure.

The invention can be used to shutter an aerosol stream produced by continuous mode aerosolization processes including, but not limited to ultrasonic atomization and pneumatic atomization. Both atomization processes provide constant generation of aerosol once the aerosol generation is initiated. The invention provides a means to cleanly and efficiently shutter aerosol streams produced from continuous mode aerosolization sources.

The invention can also be used to shutter an aerosol stream produced from a pulsed aerosolization source. Pulsed aerosolization sources use a volume displacement process wherein a precise, minute volume of fluid is forced through an orifice to form a droplet. In some cases, it desirable to start and maintain the production of aerosol at a specific pulse frequency throughout the deposition process. Shuttering can be used to divert the resulting droplet stream according to a programmed schedule, thereby deliberately interrupting the deposition process and enabling fabrication of discreet structures.

The shuttering mechanism of the invention is typically operated with the flow cell pressure held approximately constant during the shuttering process. Constant pressure operation enables deposition shuttering times on the order of tens of milliseconds.

BRIEF DESCRIPTION OF THE DRAWINGS

The detailed description will refer to the following drawings, wherein like elements are referred to by like numbers.

FIG. 3 is a plot of the flow cell pressure during operation of a deposition apparatus using a pneumatic shutter.

DETAILED DESCRIPTION OF THE INVENTION

In direct printing, a material is deposited onto a substrate without the use of masks or lithographic techniques. An aerodynamic lens system forms a thin aerosol jet surrounded by a sheath gas for direct printing. The diameter of the collimated aerosol flow is a function of the lens system parameters, such as the individual lens element channel length and orifice diameter. The external pneumatic shutter of the present invention intermittently interrupts the collimated aerosol flow, enabling deposition of discreet structures on a substrate.

The invention provides a method to interrupt the aerosol flow stream directed towards a print surface to quickly enable and disable printing of discrete features onto the print substrate. In one embodiment, the shuttering mechanism is mounted external to the aerosol print head so that the aerosol flow stream can flow through a central flow channel of the shuttering apparatus without disturbing the collimation of the aerosol flow stream. Secondary flow channels are used to: (1) redirect the collimated aerosol flow stream into a secondary channel, and (2) to collect and contain the aerosol material such that it cannot be deposited onto the print substrate. This shutter apparatus uses a positive gas flow from one channel to redirect the aerosol stream toward the collection channel and vacuum pressure on the collection side to assist with the aerosol collection process. Note that this shuttering mechanism can be made operable using either positive pressure or vacuum pressure; however, there is a minimum impact to operating pressure within the print head during the shuttering process when both positive and vacuum pressures are applied and balanced across the aerosol output orifice.

The pneumatic shutter assembly of the present invention can be used to shutter a continuous stream. However, the shutter can also be used for on-demand systems. In continuous stream systems, an unbroken stream of solid or droplet aerosol particles propagates through a flow cell and is deposited on a substrate. In an on-demand system, the particles are deposited in a pulsed mode, so that a single quanta of material is deposited in response to a drive signal. Maintenance of particle production is advantageous in continuous and on-demand systems. The invention allows for constant material production during the shuttering process, so that precise and reliable deposition is provided.

Figure 1:
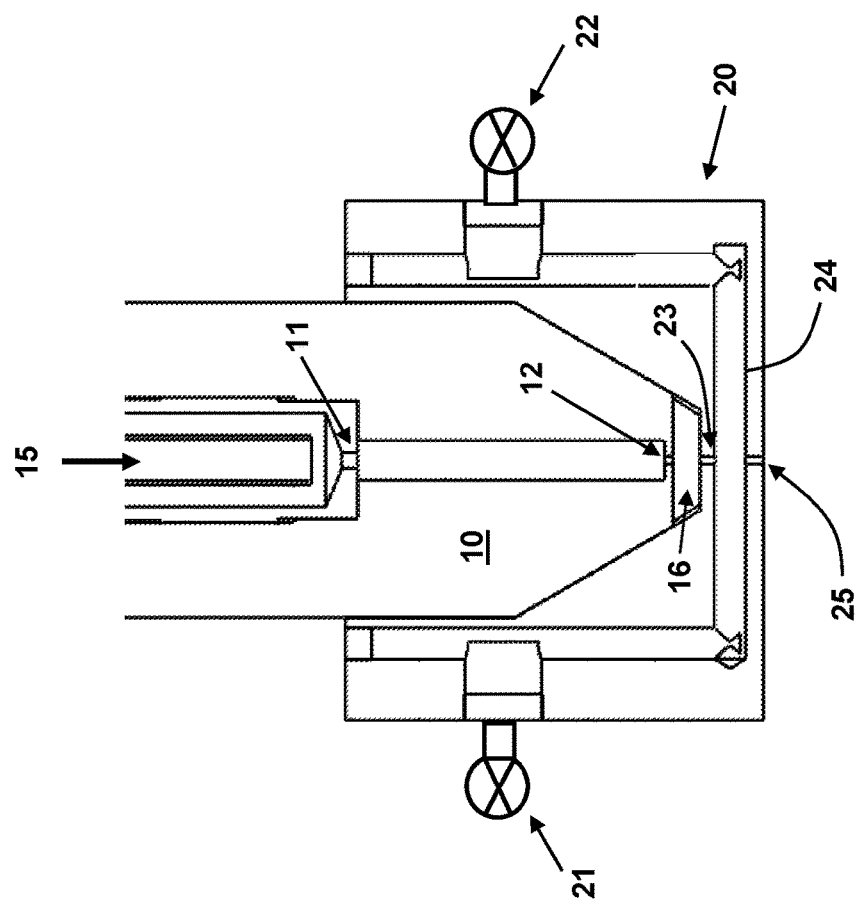
FIG. 1 is a schematic illustration of an aerodynamic lens system with a pneumatic aerosol shutter.

A cross-sectional illustration of an exemplary nozzle/shutter assembly is shown in FIG. 1. In general, the nozzle comprises a series of flow orifices 11 and 12 within an aerosol print head 10. This series of flow orifices 11 and 12 forms an aerodynamic lens system that focuses and collimates an aerosol stream 15. The aerosol stream 15 is sheathed after passing from the first lens 11 and during passage through the second lens 12. The aerosol stream is shuttered using a pneumatic shuttering assembly 20. Prior to entering the pneumatic shutter 20, the combined annular flow from the aerodynamic lens system can pass through a third orifice 23. The third orifice 23 is located below a volume 16 that is open to atmosphere for the purpose of decoupling the pressure in the print head 10 from the shuttering gas pressure. Reduction of the diameter of the aerosol beam using the aerodynamic lens system 11 and 12 allows the aerosol stream to be focused and accelerated to pass through the shutter system orifices 23 and 25. The shuttering assembly 20 is downstream from the print head 10 and comprises two computer-controlled valves 21 and 22 that establish a differential pressure and gas flow in a horizontal channel 24. During shuttering, valve 21 can be used to introduce a pressurized inert gas flow that propagates along the horizontal channel 24 that runs substantially perpendicular to the flow axis of the aerosol stream 15. The cross flow through the perpendicular channel 24 enables shuttering of the aerosol stream to a collection side of the channel according to a programmed schedule. A pressure regulator can be used to set the flow rate through valve 21 to a rate greater than the flow rate of the combined sheath/aerosol flow. The decoupling volume 16 allows the shutter flow rate to be greater than the combined sheath/aerosol flow rate with minimum effect on pressure in the print head 10. Valve 22 can be connected to a vacuum source. A flow metering device can be located between valve 22 and the vacuum source to enable the vacuum-side flow rate to be matched to the flow rate of the gas from valve 21.

Figure 2:
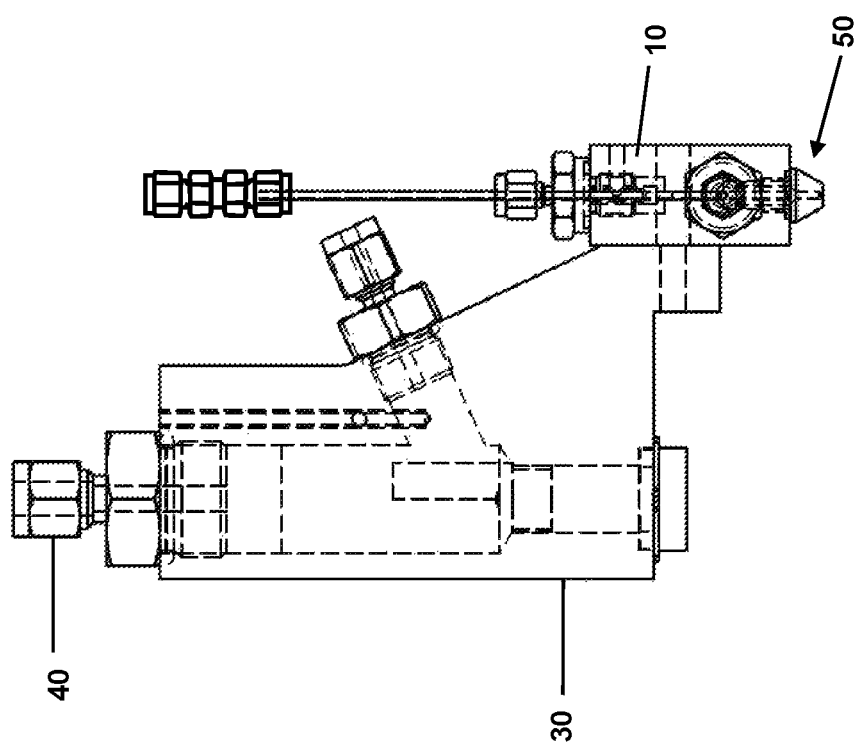
FIG. 2 is a schematic illustration of a deposition apparatus that can use a pneumatic aerosol shutter.

A typical deposition apparatus is shown in FIG. 2. In the generalized case, the apparatus comprises an aerosol generator 30, print head flow cell 10, an exit nozzle 50, and a process control system (not shown) for deposition of discreet structures on a substrate. The external shutter assembly (20, not shown) can be attached to the print head nozzle 50. The apparatus can use an ultrasonic atomizer (not shown) to produce a narrow distribution of droplet diameters tuned to an aerodynamic lens system; however, a shutter assembly can be used to interrupt the flow of an aerosol stream produced by any number of means. An inert carrier gas enters the atomizer through input port 40. The flow cell 10 comprises a flow chamber housing and the aerodynamic lenses that incorporates the sheath gas flow.

Pneumatic Shuttering

Programmed interruption of the aerosol stream to the substrate surface is required for maskless deposition of discreet structures. Shuttering can be accomplished by diverting a combined aerosol/sheath flow to a collection chamber using a vacuum or pressure-based actuation, or a combined pressure-based and vacuum-driven flow. In the typical case, a sheath and aerosol flow are combined to produce an annularly propagating combined flow comprising an inner aerosol-laden flow and an outer sheath flow. The combined flow pressurizes the print head flow cell volume. Constant flow cell pressure is desired for stable printing and shuttering. Accordingly, the most effective shuttering is accomplished when the print head pressure is held constant during the shutter open, flow diversion, and shutter close processes. An increase in pressure can result in a departure from laminar flow along the exhaust flow path, resulting in the accumulation of particles on the exhaust channel surfaces. A decrease in flow cell pressure can result in de-collimation or defocusing of the aerosol stream.

Shuttering of an Aerosol Stream Formed by a Multi-Lens System

In a multi-lens aerodynamic system, an aerosol stream is focused and collimated while passing through a series of contractions and expansions produced by a lens assembly. The exemplary embodiment shutters the aerosol stream as it passes between the third and fourth orifice, but the shutter can divert the stream at any point along the aerosol flow axis.

Maintenance of Constant Flow Cell Pressure

Figure 3:
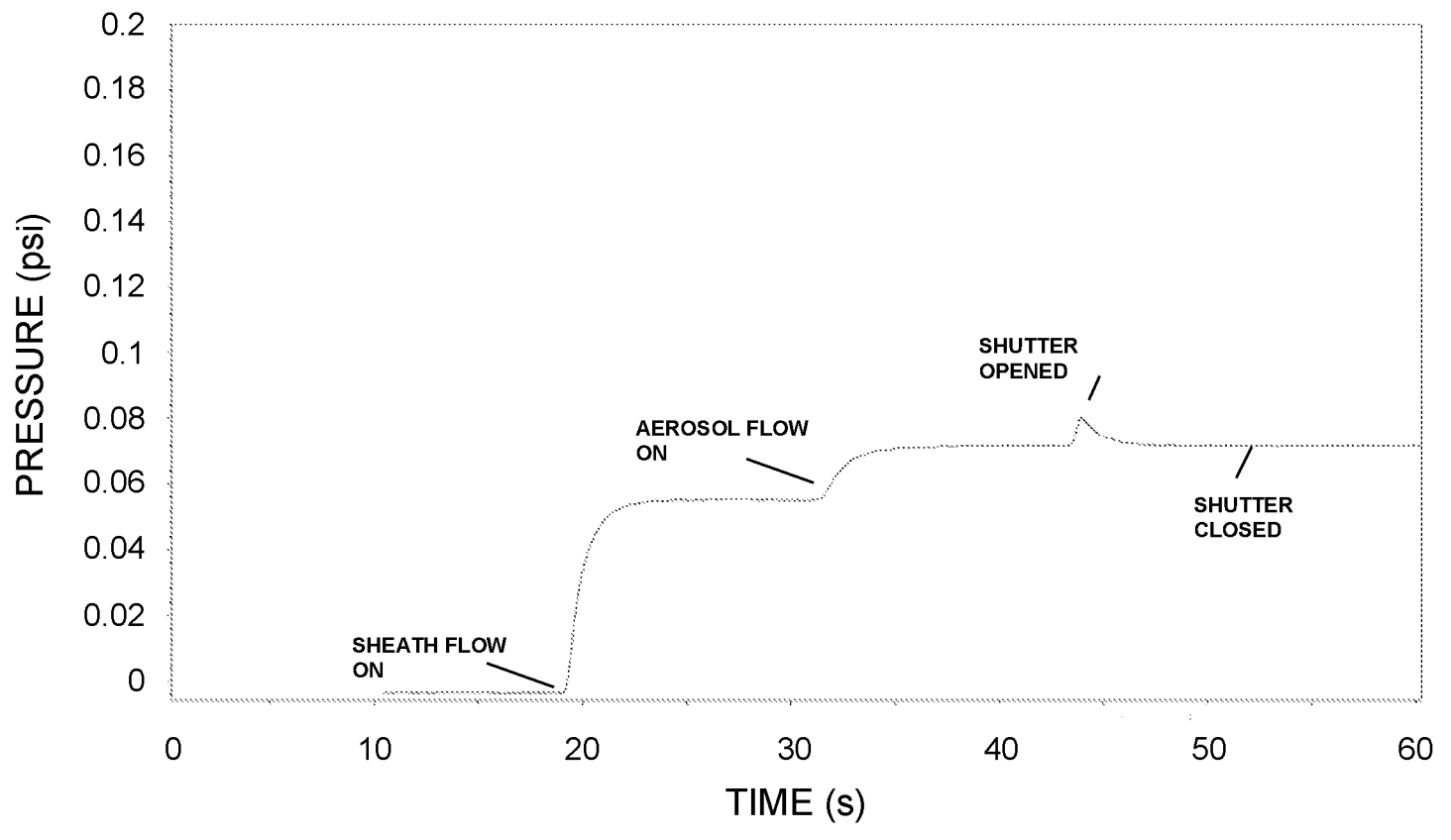

Maintaining a constant pressure in the flow cell throughout shuttering and re-establishing deposition is preferred for the production of fast, clean, and efficient aerosol shuttering. The operational pressure (the pressure developed in the flow cell during deposition) is preferably maintained during the shuttering process, so that no time is required to re-establish the operational steady state pressure when the shutter valves are closed. An example of a pressure curve during shuttering is shown in FIG. 3. In this example, the sheath gas is turned on for the print head at about 20 sec. Once pressure is established, the aerosol carrier gas is turned on at about 30 sec. The shutter gas and vacuum flow rates are then adjusted to minimize pressure perturbations when the shutter is opened and to quickly return to normal operating pressure when the shutter is closed.

Multi-Nozzle Microjet Arrays

The general design of invention is applicable to the manufacture of multi-nozzle arrays. In a multi-nozzle configuration, an assembly comprising several exit nozzles with sheathed flows is fabricated—usually in a linear array—so that simultaneous deposition from each nozzle is provided.

Laser-Assisted Deposition

In another embodiment, the deposition apparatus can be configured so that the aerosol stream is intercepted at the substrate by a focused laser beam. The laser focus provides preferential heating of the sample liquid. The configuration enables deposition of features with line widths less than 10 microns. The laser-jet configuration allows for controlled heating and evaporation of the deposited liquid while minimizing heating of a transparent or nearly transparent, or opaque substrate. In some cases, uncontrolled spreading of the jetted liquid can occur as the liquid strikes the substrate. Increasing the viscosity of the liquid just above the deposition zone changes the fluid dynamics so that uncontrolled spreading and even splashing is eliminated. Laser heating of the liquid just before or just after impact onto the substrate increases the viscosity of the liquid. The increased viscosity allows for deposition of structures with increased line height, and also enables printing of three-dimensional structures. The line height is then dependent on the incident laser power, the liquid deposition rate, and the substrate speed.

Direct Printing of UV Curable Inks

As another example of laser-assisted liquid jet deposition, the inner liquid can be a UV curable ink. Focused or unfocused UV or visible laser radiation is directed onto the jet so that in-flight curing of the ink (core liquid) is accomplished. The laser radiation can also be focused onto the substrate deposition zone to promote real time curing of the deposited ink. A subsequent substrate heating step can remove any residual sheath liquid from the substrate surface.

Direct Printing of Films and Discreet Structures

The apparatus is capable of printing continuous lines on a substrate. If the substrate is placed some distance beneath the aerosol stream such that the distance is above the point of initiation of Rayleigh instabilities, a continuous line can be written as the substrate is moved. The width of the line depends on the apparatus parameters, the fluid parameters, and the substrate speed. The apparatus is capable of operating at print speeds of approximately 1 to 5000 mm/sec.

3D Printing

The invention can also be used to build three-dimensional structures using a layer-wise process, wherein simple and complex objects are printed directly from a computer-automated drawing (CAD) file. In the 3D printing process, laser-assisted deposition or a viscoelastic ink can be used to deposit a liquid filament with a viscosity sufficient to form a rigid or semi-rigid structure upon which subsequent layers are deposited. In the 3D printing technique, a digital model of an object is intersected with horizontal planes. The horizontal planes form cross sectional representations or slices of the object. Information in each slice is uploaded to a computerized motion control system, so that a solid object can be fabricated using an additive manufacturing process. The process can be used to fabricate three-dimensional objects from materials including, but not limited to, metals, ceramics, and plastics.

3-D Structures for Medical Applications

In yet another embodiment, the apparatus can be used to produce structures for medical applications. The flow cell technology can be used to produce scaffolding for tissue engineering applications. The same flow cell can also be used to print living cells and nutrients for those cells in tissue engineering applications.

The present invention has been described as an apparatus for pneumatic shuttering of an aerosol particle stream. It will be understood that the above description is merely illustrative of the applications of the principles of the present invention, the scope of which is to be determined by the claims viewed in light of the specification. Other variants and modifications of the invention will be apparent to those of skill in the art.

We claim:

1. An apparatus for pneumatically shuttering of an aerosol particle stream, comprising:
   an aerosol generator for generating an aerosol stream of particles,
   a print head comprising an aerodynamic lens system having at least two aerodynamic lenses with a sheath gas flow for collimating the aerosol particle stream prior to exiting through an exit nozzle, and
   a pneumatic shutter comprising a gas flow substantially perpendicular to the flow axis of the collimated aerosol particle stream to shutter the collimated aerosol particle stream exiting the exit nozzle away from the flow axis according to a programmed schedule.

2. The apparatus of claim 1, further comprising a decoupling volume between the print head and the pneumatic shutter for decoupling the pressure in the print head from the pressure in the pneumatic shutter.

3. The apparatus of claim 1, wherein the pressure in the pneumatic shutter is a positive pressure greater than atmospheric pressure.

4. The apparatus of claim 1, wherein the pressure in the pneumatic shutter is a vacuum less than atmospheric pressure.

* * * * *